Oct. 19, 1965 KANICHIRO ISHIBASHI ET AL 3,212,769
AIR CUSHION SUSPENSION DEVICE WITH
VARIABLE THROTTLING MEANS
Filed Oct. 19, 1962

INVENTORS
KANICHIRO ISHIBASHI,
YOSHIHARU KITAMOTO,
TOSHIYATA TEZUKA,
AKIHISA MORI,
HIROYUKI YOSHITOMI,
FUJIO OKAWA
BY Stevens, Davis, Miller & Mosher
ATTORNEYS

United States Patent Office 3,212,769
Patented Oct. 19, 1965

3,212,769
AIR CUSHION SUSPENSION DEVICE WITH VARIABLE THROTTLING MEANS
Kanichiro Ishibashi, Minato-ku, Tokyo, Yoshiharu Kitamoto, Tozuka-ku, Yokohama, Toshiyata Tezuka, Hodogaya-ku, Yokohama, and Akihisa Mori, Hiroyuki Yoshitomi, and Fujio Okawa, Tozuka-ku, Yokohama, Japan, assignors to Bridgestone Tire Company Limited, Tokyo, Japan, a corporation of Japan
Filed Oct. 19, 1962, Ser. No. 231,800
Claims priority, application Japan, Oct. 25, 1961, 36/38,405; Dec. 6, 1961, 36/43,553; Mar. 28, 1962, 37/11,447
6 Claims. (Cl. 267—65)

The present invention relates to improvements in air cushion device with variable throttling means accompanying damping effects applicable to vehicles.

It is well known that by providing a throttling means between the variable volume chamber and the constant volume chamber of an air cushion such, for instance, as between the bellows and a reservoir tank a damping force can be produced due to the throttling effect, but in such throttling means the spring constant increases as the vibration increases so that comfortable driving is disturbed.

The invention is to improve the above disadvantages and to provide an air cushion device for vehicles, which can develop practically a low dynamic spring constant in high frequency and a high dynamic spring constant in low frequency by automatically varying the throttling area due to the difference in pressures between two volumes and in combination thereto a pressure delaying chamber associated with the variable volume chamber for improving the frequency dependency of dynamic spring constant of the suspension device and by the use of the air damper of the invention the oil damper used at present can be dispensed with and the suspension mechanism is not only very simplified but also it has superior characteristics as suspension device.

Figure 1:
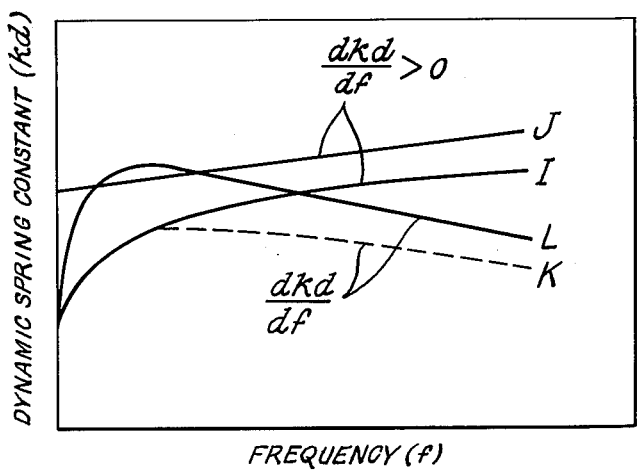
Figure 2:
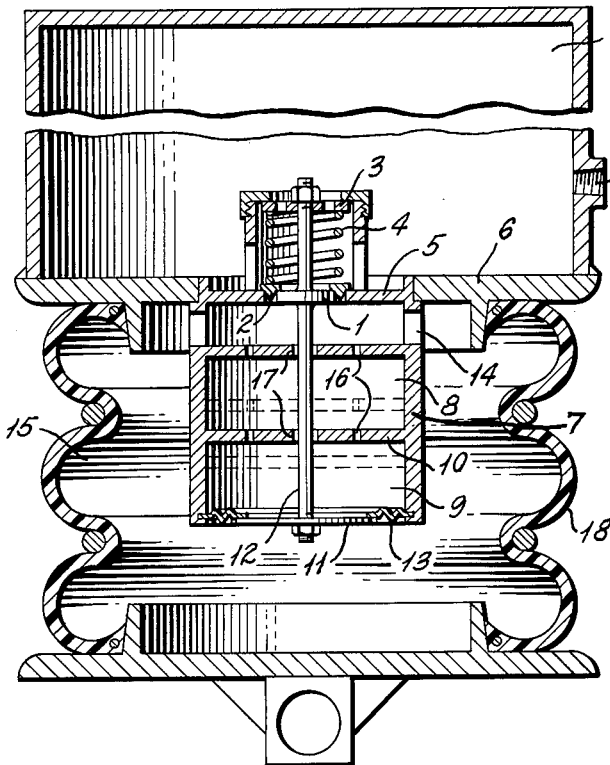
Figure 3:
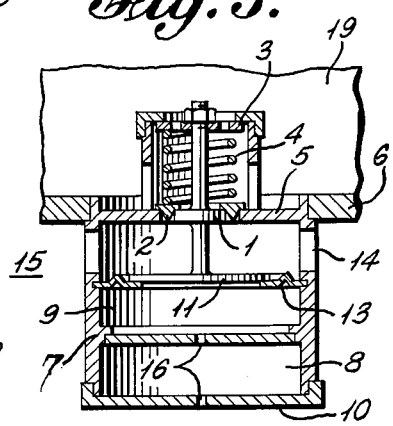

In order that the invention may readily be carried into effect, some embodiments thereof will now be described, by way of example, with reference to the accompanying drawings, in which FIGURE 1 represents curves for illustrating vibration characteristics of dynamic spring constants of various kinds of suspension devices;

FIGURE 2 is a diagrammatical sectional view of an embodiment of the device of the present invention wherein a variable throttling means provided with a pressure delaying chamber for improving the variation characteristic of the dynamic spring constant is applied to an air cushion; and FIGURE 3 is a diagrammatical sectional view showing a modified form of pressure delaying chamber.

The present invention relates to the variable throttling devices for improving the frequency dependency of dynamic spring constant for suspension device of vehicles.

The invention is to provide a novel device which can realize the frequency dependency of the dynamic spring constant having negative gradient or slope and such a device is shown in FIG. 2 wherein an additional damping means operating responsively to the difference in pressures is added to the conventional throttling valve device. Referring to FIG. 2 numeral 1 represents a main valve; 2 an auxiliary valve; 3 a spring seat; 4 a balancing spring; 18 a rubber bellows; and 20 an air inlet opening. When the main valve 1 is shifted upward the auxiliary valve 2 is also shifted with it and an air passage is established between the auxiliary valve 2 and the valve casing, while when the main valve 1 descends the air passage is established between the main valve 1 and auxiliary valve 2. The additional damping means or so-called pressure delaying chamber consisting of an enclosed casing 7 is connected or made integral with the valve casing 5 or independently therefrom and secured to the base of the constant volume chamber 6 if desired. The casing 7 is separated into a suitable number of sections 8 and 9 by means of partition 10 and a pressure responsive disc 11 is secured to a spindle 12 which is rigidly secured or made integral with the main valve 1 and the pressure responsive disc is connected to the casing 7 by means of a flexible diaphragm 13. The casing 7 is provided with a free opening 14 communicating to the air cushion chamber 15 and the partition walls 10 are provided with a suitable number of small holes 16. Some air gap or clearance 17 may be provided between the spindle 12 and the partition walls 10—10′. Thus, the pressure responsive disc 11 connected to the casing 7 by means of the flexible diaphragm 13, and the air chambers 8 and 9 having restricted air passages 16 and air gaps 17, constitute a pressure delaying means.

The operation of the device as shown in FIGURE 2 will be explained below.

While the air cushion bellows 18, as in FIGURE 2, is slowly compressed by the external force and the pressure in the variable volume chamber 15 is raised, above that of the constant volume chamber 19 the main valve 1 is raised as a unit with the auxiliary valve 2 against the bias of spring 4 but in this case the force acting on the pressure responsive disc 11 does not assist to lift the valves 1 and 2 and does not amplify the opening. In the case when the air cushion is compressed suddenly the pressure variation of the gas in the chambers 8 and 9 is restricted by small holes 16 and gaps 17 provided in the partition walls, thereby causing the delaying effect and the valve is lifted by the force caused by the pressure difference between the air cushion chamber 15 and auxiliary pressure delaying chamber 9. If the effective area of the pressure responsive disc 11 is represented by $A_3$, that of the main valve 1 $A_1$, that of the auxiliary valve 2 $A_2$, the internal pressure of the air cushion chamber 15 $p_1$, that of the constant volume chamber 19 $p_2$, that of the pressure-delaying chamber 8 $p_3$, and that of the pressure delaying chamber 9 $p_4$, then a pneumatic force $F_1$ to cause upward movement of the main valve and the auxiliary valve as a unit in case of a compression stroke is given by $$F_1 = (A_1 + A_2)(p_1 - p_2) + A_3(p_1 - p_4) \quad (1)$$

when the variation of pressure applied to the air cushion chamber is slow, the small openings 16 and the narrow gaps 17 substantially equalize $p_4$ with $p_1$ causing $p_1 - p_4 = 0$, and the force acting on the pressure responsive disc 11, which is represented by the second term of the right side of the Equation 1, is negligible. On the other hand, when the variation of the pressure applied to the air cushion chamber is quick, the small openings 16 and narrow gaps 17 effectively suppress the increase of pressure $p_4$ despite quick increase of $p_1$, causing $(p_1 - p_4) > 0$, thereby the force acting on the pressure responsive disc 11 assists the upward displacement of the main valve and the auxiliary valve as a unit. In other words, when the air cushion is suddenly pressed, the pressure delaying chambers and the pressure responsive plate act to increase the apparent effective area of the main and auxiliary valves and the throttle opening area increases. In short, the effective area of the throttle opening is narrow for slow variation of pressure while the effective area of the throttle opening is wide for sudden variation of pressure. On the contrary, when the air cushion is expanded the operation is reverse to that just explained. In both cases, the movement of the main valve is increased so that the increase of dynamic spring constant of the air cushion owing to the deficient opening of the throttling area can be prevented by the pressure delaying device of the invention. If the compression and expansion of the air cushion occur slowly the pressures in the air cushion chamber and the pressure delaying chambers maintain equilibrium condition at once so that the above pressure delaying effect does not occur, so that the additional pressure delaying means is effective at high frequency only.

FIG. 3 shows a modified form of FIG. 2 wherein the position of the pressure responsive disc 11 with respect to the pressure delaying chambers 8 and 9 is reversed causing inversion in the direction of forces acting on the pressure responsive disc 11. The operation of the device as shown in FIG. 2 can be explained in a similar manner to that of the device of FIG. 1. If the air cushion bellows 18, as in FIG. 2 is compressed by an external force, then the pneumatic force $F_2$ causing downward movement of the main valve 1 is given by $$F_2 = (A_1 + A_2)(p_2 - p_1) + A_3(p_1 - p_4) \quad (2)$$

Here, the pressures and areas are represented by the same symbols with those for the Formula 1.

When the variation of pressure applied to the air cushion chamber is slow, the small openings 16 and the narrow gaps 17 substantially equalize $p_4$ with $p_1$ causing $(p_1 - p_4) = 0$, and the force acting on the pressure responsive disc 11, which is represented by the second term of the right side of the Equation 2, is negligible. On the other hand, when the variation of the pressure applied to the air cushion chamber is quick, the small openings 16 and narrow gaps 17 effectively suppress the increase of pressure $p_4$, while the pressure $p_1$ in the variable volume chamber 19 is quickly increased, causing $(p_1 - p_4) > 0$, thereby the force acting on the pressure responsive disc 11 assists the downward displacement of the main valve 1 from the valve seat 5 and auxiliary valve 2.

In the device shown in FIG. 2, if the air cushion 18 expands suddenly and the pressure in the chamber 15 is suddenly reduced, the force due to the pressure acting on the effective area of the upper side of the diaphragm 11 and the main valve 1 is overcome by the force acting upwards on the lower side of the diaphragm 11 due to the higher pressure in the damped chamber 9 so that the main valve 1 is lifted together with the auxiliary valve 2 against the bias of spring 4 and the pressure of the constant volume chamber acting on the main and auxiliary valves 1 and 2 to provide a wider valve opening. The operation of the device shown in FIG. 2 is contrary to that of FIG. 1 and it can be used for special cases.

In the devices as shown in FIGS. 2 and 3, instead of connecting the pressure responsive disc 11 to the casing 7 by means of a flexible diaphragm 13, the outer periphery of the disc 11 may be made a little smaller than the inner wall of the casing to remain some air gap, then the same effect can be obtained. Furthermore, the pressure delaying chamber be made to a desired number of sections according to the requirement.

As above described the device according to the invention can realize a specific spring effect having negative gradient as the frequency increases i.e., it operates as a soft spring for a low vibration while it operates as a hard spring in case of higher vibration, which has never been accomplished before and by suitable selection of the elements which affects the pressure delaying means the spring suspension device for vehicles of the invention increases the stability of vehicles since the spring constant is hard (large) at a lower vibration such as rolling or pitching of vehicles and enables very comfortable driving since the spring constant is soft (small) at quick vibration such as road shocks.

What we claim is:

1. An air suspension device for vehicles with variable throttling means which comprises a controlling valve device provided between a variable volume chamber of air cushion and a constant volume chamber connected to said air cushion chamber, said controlling valve device consisting of a main valve member and a co-acting auxiliary valve member biased by a spring acting thereon and a corresponding spring support by which said main valve is supported at one end and normally closes the opening together with said auxiliary valve member, a pressure delaying chamber, and a pressure responsive disc operatively connected to the pressure delay chamber to be under the control of said pressure delaying chamber provided in said variable chamber of said air cushion.

2. An air suspension device for vehicles having variable throttling means, said air suspension device having a variable volume chamber and a constant volume chamber, means providing communication between said chambers, said throttling means comprising a controlling valve, said controlling valve being located within said communication means, said controlling valve consisting of a main valve member and co-acting, co-axial auxiliary valve member, spring means acting against said auxiliary valve member normally biasing both said main and said auxiliary valves closed, a pressure delaying chamber, said pressure delaying chamber fastened to and depending in said variable volume chamber, said pressure delaying chamber being open at its inner end, a pressure responsive disc disposed across and operatively connected to said open inner end of said delaying chamber, valve operating means connected between said main valve member and said pressure responsive disc whereby an increase in pressure in said variable volume chamber will cause both said main and said auxiliary valves to be opened and a decrease in pressure in said variable volume chamber will cause only said main valve to be opened.

3. An air suspension device according to claim 2, wherein said pressure delaying chamber comprises a plurality of independent parallel sections which are in communication through a suitable number of restricted damping air passages, and at least one of said sections having an opening in its periphery.

4. An air suspension device for vehicles with variable throttling means, said air suspension device having a variable volume chamber and a constant volume chamber, said constant volume chamber being in communication with a source of air, communication means between said chambers, said variable throttling means comprising a controlling valve operatively mounted within said communication means, said valve comprising a main valve member and a coacting coaxial auxiliary valve member, spring means acting against both said main valve and said auxiliary valve member normally biasing both said valve members closed, said controlling valve having a damping means, said damping means being a pressure responsive disc and a damping chamber, said disc being disposed across one end of said damping chamber and responsive to the pressure difference between said variable volume chamber and said damping chamber, said disc being operatively connected to said controlling valve, said disc opening both said valves when the pressure differential is high and opening only said main valve when the pressure differential is low, said damping chamber having a plurality of partition walls substantially perpendicular to the walls of said damping chamber, said partition walls having therein a plurality of air passages to give the desired damping, said passages being so arranged that said valve will close thereby interrupting communication between said variable volume and constant volume chambers when the pressures in these two chambers are substantially equal, said valve being opened by a sudden change in the pressure in said variable volume chamber and said valve opening an amount in proportion to the difference in pressures between said two chambers.

5. An air suspension device for vehicles according to claim 4 wherein said pressure responsive disc of said damping means is secured to said controlling valve by means of a coaxial spindle arranged to slide in said damping chamber and said damping chamber having a definite opening in its periphery.

6. An air suspension device for vehicles according to claim 5 in which said pressure responsive disc is secured to one side of said damping chamber by means of a flexible diaphragm, said damping chamber consisting of a plurality of independent sections which are in communication through a plurality number of restricted damping air passages.

References Cited by the Examiner

UNITED STATES PATENTS

| | | | |
|---|---|---|---|
| 21,535 | 1858 | Hardy et al. | 137—493.2 |
| 1,470,057 | 10/23 | Carter | 137—510 |
| 2,031,000 | 2/36 | Mercier | 267—65 |
| 2,844,165 | 7/58 | Morse | 137—510 X |
| 2,939,698 | 6/60 | Polhemus | 267—65 |
| 2,977,134 | 3/61 | Helling. | |
| 3,038,716 | 6/62 | Brown et al. | 267—65 |
| 3,092,137 | 6/63 | Thieme et al. | 137—493 |

FOREIGN PATENTS

| | | |
|---|---|---|
| 548,353 | 4/32 | Germany. |
| 1,078,051 | 3/60 | Germany. |
| 502,218 | 3/39 | Great Britain. |

ARTHUR L. LA POINT, *Primary Examiner.*

MARTIN P. SCHWADRON, *Examiner.*